(12) United States Patent
Frenette et al.

(10) Patent No.: US 10,326,767 B2
(45) Date of Patent: *Jun. 18, 2019

(54) AUTO CONFIGURATION FOR AUTO-ENROLLED ACCESS CONTROLLER SYSTEMS

(71) Applicant: SENSORMATIC ELECTRONICS, LLC, Boca Raton, FL (US)

(72) Inventors: Stephan Frenette, Montreal (CA); Gabriel Labrecque, St-Luc (CA); Jean-Francois Roy, St-Jean-sur-Richelieu (CA)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 603 days.

This patent is subject to a terminal disclaimer.

(21) Appl. No.: 14/497,445

(22) Filed: Sep. 26, 2014

(65) Prior Publication Data

US 2016/0094559 A1    Mar. 31, 2016

(51) Int. Cl.
*H04L 29/06* (2006.01)

(52) U.S. Cl.
CPC ........ *H04L 63/101* (2013.01); *H04L 63/0281* (2013.01); *H04L 63/0876* (2013.01)

(58) Field of Classification Search
CPC .............. H04L 63/101; H04L 63/0281; H04L 63/0876
See application file for complete search history.

(56) References Cited

U.S. PATENT DOCUMENTS 6,624,750 B1 * 9/2003 Marman ............. G08B 25/003
340/4.3

| | | | |
|---|---|---|---|
| 2002/0152298 A1 * | 10/2002 | Kikta ................ | H04L 12/2803 709/223 |
| 2003/0140223 A1 * | 7/2003 | Desideri ............ | H04L 63/0272 713/153 |
| 2008/0013259 A1 * | 1/2008 | Barton ................ | H05K 5/0013 361/809 |
| 2008/0064365 A1 * | 3/2008 | Lang .................. | G08B 25/005 455/404.1 |
| 2013/0185400 A1 | 7/2013 | Larson | |
| 2014/0258724 A1 * | 9/2014 | Lambert ............. | H04L 63/062 713/170 |

FOREIGN PATENT DOCUMENTS

EP          2 549 786          1/2013

OTHER PUBLICATIONS

International Search Report and Written Opinion, PCT/US15/52567.
International Preliminary Report, PCT/US2015/052567.

* cited by examiner

*Primary Examiner* — William S Powers
(74) *Attorney, Agent, or Firm* — Foley & Lardner LLP

(57) ABSTRACT

Disclosed is a system for a facility supporting an access controller, at least one ingress card reader and an auto-enrollment type controller including a front panel having a single button, a controller board, a terminal block for connecting at least the one ingress card reader to the auto-enrollment type controller board and to connect the auto-enrollment type controller to door locks, and a mounting plate, with the auto-enrollment type controller being configured by a user according to operational requirements of the facility by the user asserting the button for a defined period of time.

20 Claims, 9 Drawing Sheets

ововATIONS

AUTO CONFIGURATION FOR AUTO-ENROLLED ACCESS CONTROLLER SYSTEMS

BACKGROUND

This disclosure relates to security systems and more particularly to access control systems.

Access control systems are installed in buildings to restrict access only to individuals that are authorized to enter specified areas. For example, some access control systems require presentation of employee access badges to a card reader before entering a facility and before entering certain areas within a facility.

When such systems are installed, an installer (or technician) configures the features of the system according to the operational requirements of the facility prior to installation and enrolling the controller with a central server facility. Often it is required that an appointment is scheduled for obtaining a configuration of the access controller, prior to enrolling the access controller. Typically, access control system configuration is entered using a software program at the central station, and codes needed for the configuration are entered manually, which can increase the chances of errors.

SUMMARY

According to an aspect a method of configuring an auto-enrollment type access controller for access control includes asserting a button for on the auto-enrollment type access controller for a specified duration to enter an auto-enrollment process, scanning a code associated with the auto-enrollment type access controller, causing the code to be sent to a server, receiving by the auto-enrollment type access controller from the server configuration information that configure the auto-enrollment type access based on the received configuration information.

According to an additional aspect a server system includes a processor and memory and executes a computer program product to configure the processor to receive a code via an e-mail message, parse the e-mail to extract relevant information obtained from the code, determine whether there is a match with an unassigned controller; and if there is a match, execute a process that finds an auto-enrollment type access controller from a unassigned controller list, assigns the controller as a master controller into the new connection, and saves the configuration; and sends a broadcast to the auto-enrollment type access controller.

One or more of the above aspects may provide one or more of the following advantages.

The above aspects uses a client device in combination with code reader applications, along with a code label on the product that provides all the data needed for the installation to simplify the installation process, and also remove the need to enter the configuration data prior to the installation. Systems employing these techniques have a simplified programming techniques such that configuration of an access control system for a card reader is simplified in terms of function and architectural design. These techniques may generally obviate the need for scheduling an appointment for obtaining a configuration of the access controller, prior to enrolling the access controller. When such systems are installed by an installer these aspects greatly simplify configuration and enrollment and obviate the need for an operator to be present at a server or workstation for many configurations of the controller. In some instances, it may be desirable that an operator is still present.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
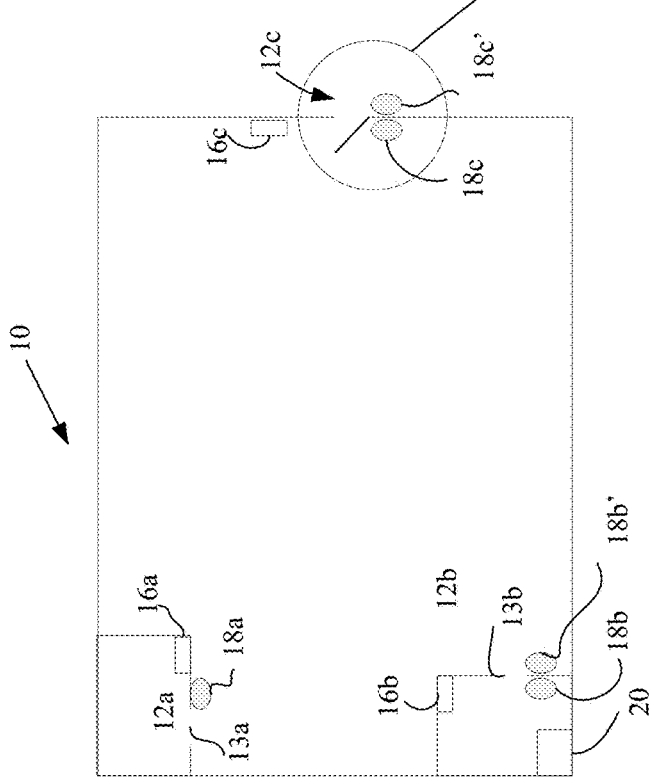
FIG. 1 is a block diagram of a typical installation at a facility.
Figure 1A:
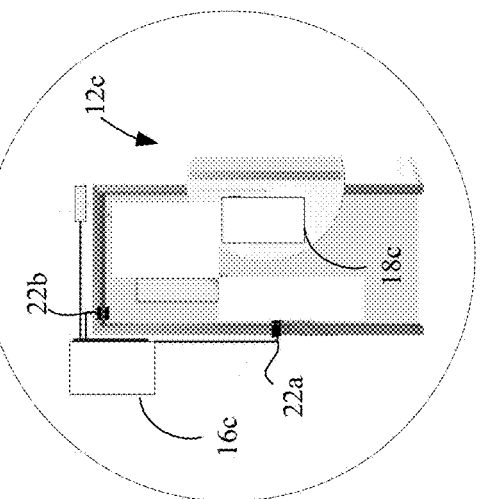
FIG. 1A is a blown up portion of FIG. 1.

Referring now to FIG. 1, a facility 10 with access control is shown. In this illustrative example, the facility 10 includes two secured rooms 12a and 12b and a single external entryway 12c. Room 12a has a doorway 13a and has associated therein an access controller 16a and an ingress card reader 18a. Room 12b has a doorway 13b and has associated therein an access controller 16b and two card readers, an ingress card reader 18b and an egress card reader 18b'. The external entryway 12c has associated therewith an access controller 16c and two card readers, an ingress card reader 18c and an egress card reader 18c'. A detailed view of the external doorway is shown in FIG. 1A with exemplary door locks 22a, 22b controlled by the access controller 16c.

Figure 2:
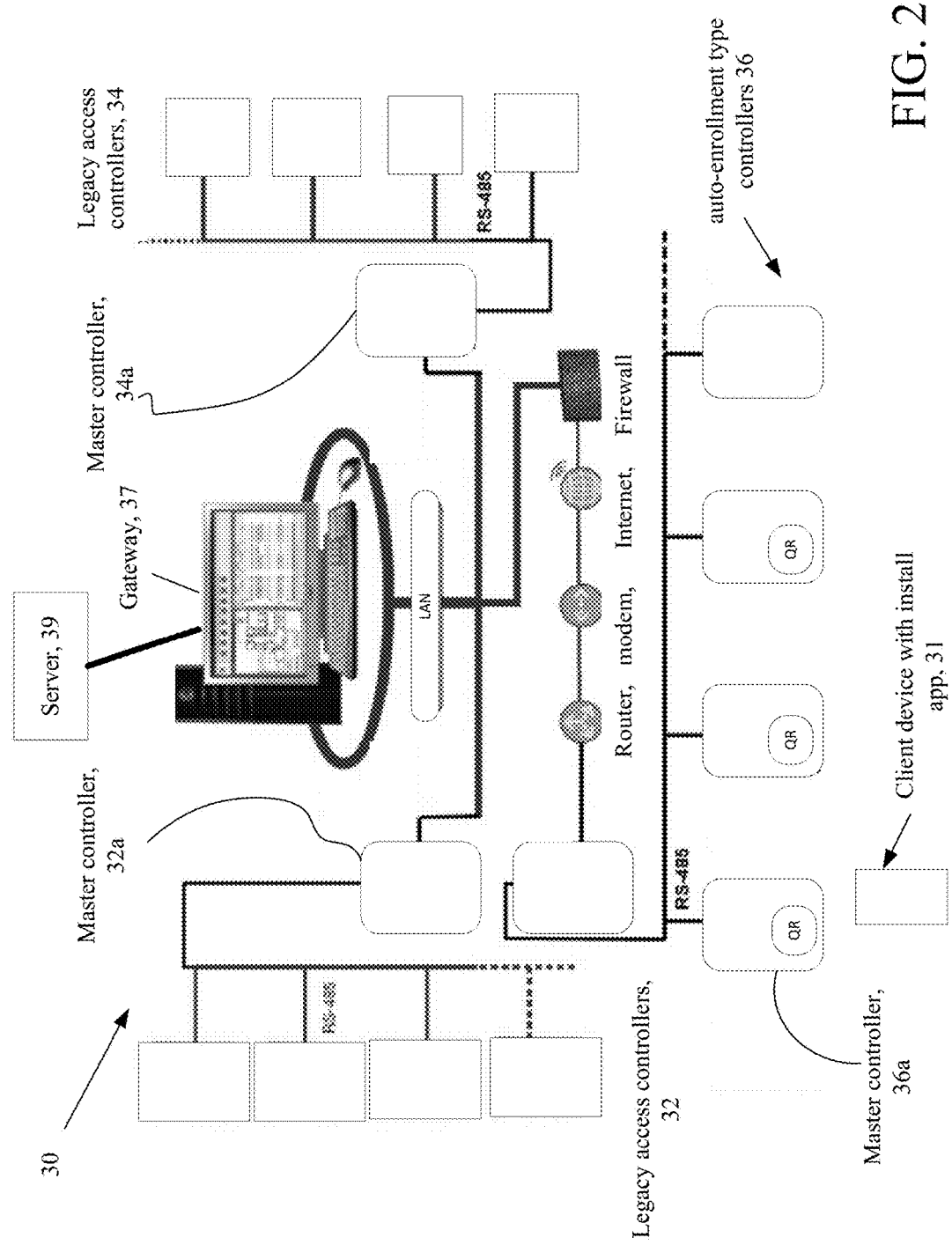
FIG. 2 is a diagrammatical view of an access controller.

Referring now to FIG. 2, an access control system 30 is shown. This particular implementation of the access control system 30 includes a first plurality of legacy access controllers 32, a second plurality of legacy access controllers 34, and a third plurality of auto-enrollment type controllers 36. Each of the pluralities of controllers 32, 34 and 36 has designated master controllers, labeled as legacy access controllers 32a; legacy access controllers 34a, and auto-enrollment type controllers 36.

For some implementations of configuration of auto-enrollment type controllers 36 an installer with a client device 31, e.g., a smart phone, a tablet computer, a laptop, etc., launches an install application that will auto configure enrollment of a particular one of the auto-enrollment type controllers 36 with the server 39. This application executes a process in which the installer device 31 reads a code, e.g., a QR code, as will be described below.

During installation of an access control system 30, the access controllers, whether the legacy access controllers 32, 34 or the auto-enrollment type controllers 36 features of the access controllers 32, 34 and 36 and the access control system 30 are configured by the installer according to operational requirements of the facility 10. While the legacy access controllers 32, 34 are configured by the installer entering information using an alpha-numeric panel located at the access point (for very old and/or inexpensive system) or using dip switches and/or remote software for more complex legacy systems, the auto-enrollment type controllers 36 feature an auto-enrollment process 40 (FIGS. 4-5) that enables an installer to enroll with the server 39, the auto-enrollment type controllers using an enrollment button. In addition, for auto-enrollment type controllers 36 the installer using the client device 31 with the install application auto configures the auto-enrollment type controllers 36 sending configuration information to the server 39.

The system also includes a gateway 37 that is coupled to the access controllers via master controllers 32a, 34a and 36a and a LAN, router, modem, the Internet and cellular or serial communications and a firewall, as illustrated and a server 39 that is coupled to the gateway 37.

Figure 3:
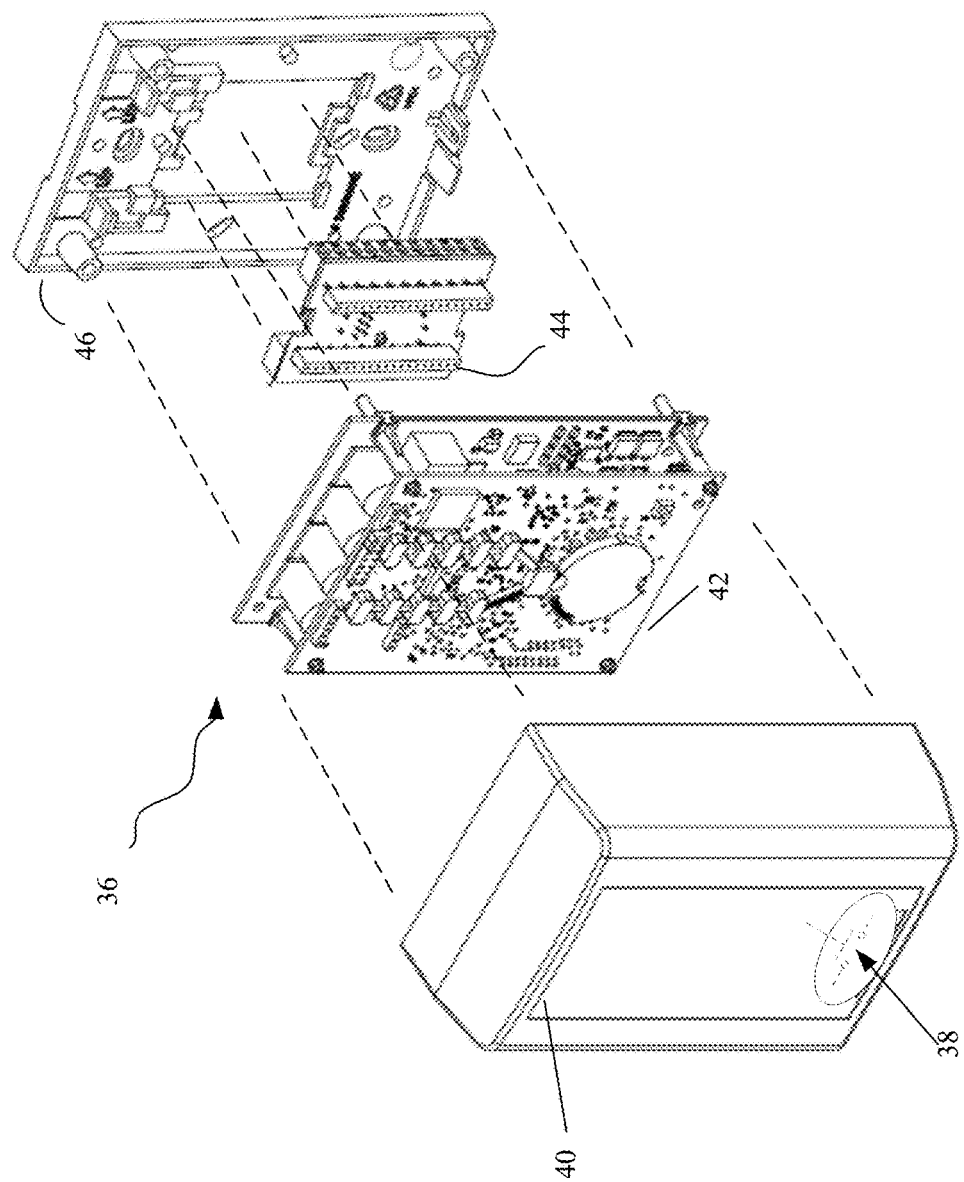
FIG. 3 is an exploded diagrammatical view of an exemplary implementation of an auto-enrollment type controller.

Referring now to FIG. 3, an exemplary configuration for an auto-enrollment type controller 36 is shown having a single push button switch 38. The single push button switch 38 (pushbutton 38) can take various forms, such as a pushbutton (continuous or momentary contact) switch or a toggle switch, but due to certain time period sequences, as discussed below, a continuous pushbutton is used, where by continuous is meant that the switch closes for as long as pressure is applied to the pushbutton 38 and opens when pressure is removed from the pushbutton 38. However, for other switches modifications could be made to the processing discussed below to accommodate the characteristics of the switch. The auto-enrollment type controller 36 also includes a front panel 40 that carries the pushbutton 38. The pushbutton 38 has various uses including use in an auto-enrollment process, as discussed below. The auto-enrollment type controller 36 also includes a controller board 42, a terminal block 44 for connecting wires to the auto-enrollment type controller board 42 from card readers and well as to connect the auto-enrollment type controller to door locks, etc., and a mounting plate 46. Details of the controller 36 will be discussed below.

Figure 4:
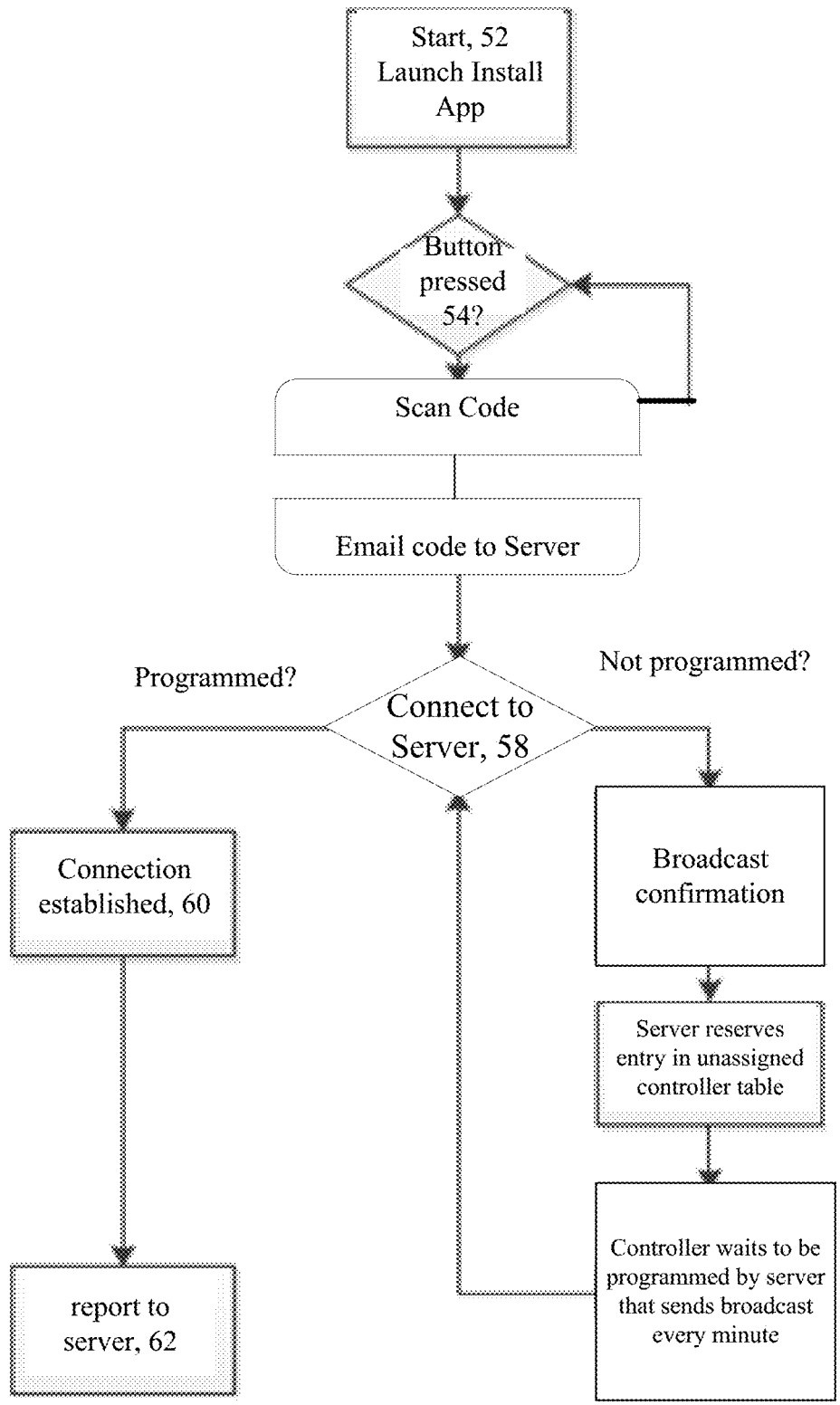
FIGS. 4-7 are flow charts of an enrollment process.

Referring now to FIG. 4, functional control caused by pressing of the button 38 is shown. The front button 38 is programmable for certain actions. This button can be used for initiation of an auto-enrollment process for the auto-enrollment type access controller 36 when not previously programmed or if previously programmed can be used for other actions such as establishing a connection and reporting to the server 39.

The control starts 52 when the button is pressed 54. Depending on the duration of the button being pressed certain actions are performed. For example, when the auto-enrollment type access controller 36 has been in communication with the software at least once, the controller will cause diagnostic LED to light and report diagnostics, when the button is asserted for 3 seconds. The controller 36 broadcasts 56 a report message to the server 39, connects 58 to the server 39 and when a connection is established 60 with the server 39, the auto-enrollment type access controller 36 reports 60 diagnostics to the server 39.

When auto-enrollment type access controller 36 has not established communication with the server 39, e.g. was not programmed and is asserted for at least 6 seconds it will stay on for 10 minutes unless the front button is pressed again. The button 38 is used as an enrollment button, when pressed for, e.g., 6 seconds. The auto-enrollment type access controller 36 sends an enrollment broadcast message every 30 seconds for a period of 10 minutes in order to access the server 39 and will cause an LED to flash when the broadcast has been received from the server 39 or the auto-enrollment type access controller 36 can cause a transducer to produce a noise, e.g., a beep to tell an installer that the server 39 has received the information correctly and the auto-enrollment type access controller 36 is ready to be programmed.

Figure 5:
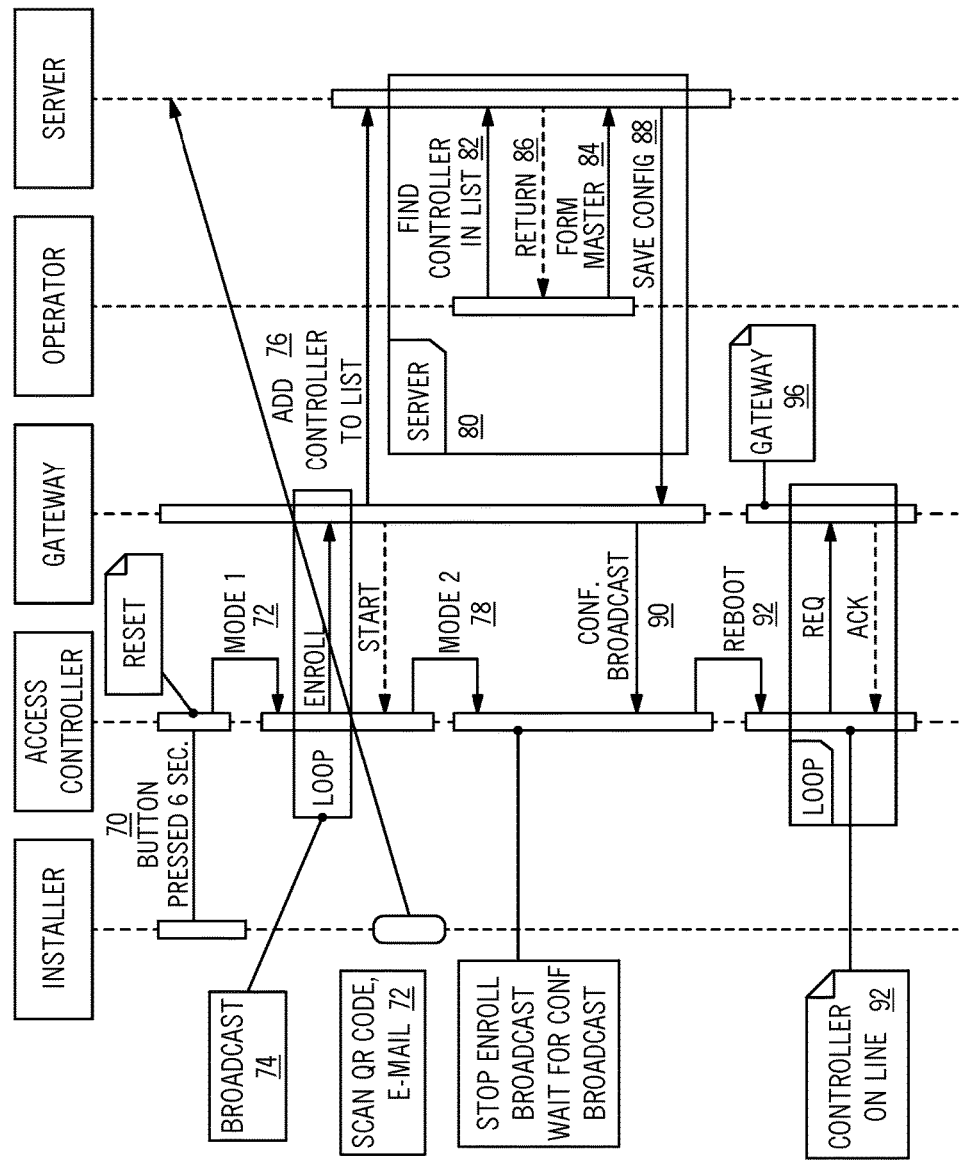

Referring now to FIG. 5, when the button 38 is used as an enrollment button several scenarios may happen in the field. From an end user (installer) stand point the flow chart remains the same in any of the scenarios. In one implementation, enrollment starts with an installer pressing 70 the front button for e. g., six seconds. Other durations are possible. For example, a shorter duration from momentary to a longer duration of 20 seconds is possible. It is merely desired that the duration is distinct from other uses of the button.

While the button is pressed for here six seconds, the auto-enrollment process for the auto-enrollment type access controller 36 broadcasts 72 during a 10 minute period at interval of 30 seconds. If the auto-enrollment type access controller 36 was not programmed, it receives a broadcast confirmation and waits to be programmed. The server 39 sends a broadcast every, e.g., minute. The installer using the install app. reads a code that is affixed to one, e.g., auto enrollment access controller 36a of the auto enrollment controllers 36. The install application, e.g., a smart phone application, reading this code is provided the configuration information for the auto enrollment controller 36a, which was coded in the QR code. The configuration information may include unique identification data such as model number, serial number (s/n) and MAC address (media access control address) of that auto enrollment controller 36a. A MAC address is a unique identifier assigned to network interfaces for communications on the physical network layer. MAC addresses are used as a network address for most IEEE 802 network technologies, including Ethernet. This occurs while the auto-enrollment type access controller 1 is in factory default, and it has not been programmed in the server 39.

The application opens up an e-mail client on the client device and sends an e-mail with the auto enrollment controller 36a credentials (configuration information) directly to the server 39. In some implementations, scanning of the QR code can launch a configuration window (not shown) on the client device 31 that allows the installer to modify any of the configuration details for that auto enroll controller, such as the name/location of the door that is associated with the controller, etc. In this instance, the modified configuration and the model, s/n and MAC addresses of the access controller are e-mailed to the server.

Six of such scenarios include auto configuration and auto enrollment of the auto-enrollment type access controller as a master over an IP connection; auto configuration and auto enrollment of the auto-enrollment type access controller as a master over an IP connection over a wide area network using the "call home" process; auto configuration and auto enrollment as a slave auto-enrollment type access controller over an IP connection; auto configuration and auto enrollment as slave auto-enrollment type access controller over an IP connection without call home; auto configuration and auto enrollment as a slave auto-enrollment type access controller over an IP connection without operator assistance; and auto configuration and auto enrollment as a slave auto-enrollment type access controller over an RS-485 connection without an operator.

The auto-enrollment type access controller 38 has several modes used during various enrollment actions.

Mode 1 (Enroll mode), the auto-enrollment process for the auto-enrollment type access controller goes into this mode when unit in factory default and the button is pressed for a period of 6 seconds. While in this mode the unit sends an enroll broadcast message every 30 seconds for a period of 10 minutes. An LED turns on to signal entry into this mode, e.g., a white flashing every 2 seconds and there can be an audible signal from an onboard transducer. It is possible to leave the enroll mode before the 10 minute time-out by holding the button for another 6 seconds.

If auto-enrollment type access controller is set with a call home IP/Hostname, the auto-enrollment type access controller transmits a "Network Pulse" along with the Broadcast including IP Address (xxx.xxx.xxx.xxx), Subnet Mask (xxx.xxx.xxx.xxx), Model, Serial Number and MAC Address. In addition, in some implementations optionally values for some of the following characteristics are also sent with the Network Pulse:

| | |
|---|---|
| Tamper Status | Total Memory Disk (RAM Disk) |
| Normal | Free Memory Disk (RAM Disk) |
| Alarm | Power Required |
| Lock/Auxiliary Power | xx.x W |
| Restore | Current Required |
| Failure | xx.x A |
| Reader Power | Voltage Supplied |
| Restore | xx.x V |
| Failure | Power Source |
| POE | Unknown |
| Failure | POE |
| Normal | POE Plus |
| Total Physical Memory | External |
| Free Physical Memory | |

Mode 2 (Enrollment Acknowledged): When auto-enrollment process for the auto-enrollment type access controller received an ACK "acknowledge", the transducer beeps 4 times and the LED flash 2.5 sec burst with a pink color, emits an audible 2.5 second burst through the onboard piezoelectric speaker and goes back to factory default mode.

Mode 3 (Prioritize Enroll Slave): Enrollment Mode is auto-enrollment process for the auto-enrollment type access controller that is configured as master and an established communication. While master controller is in master enrollment mode (button held for 6 seconds), any slave broadcast received will be added to the existing connection automatically. While in this mode the LED turns WHITE and flashes every 2 seconds. The Controller will go out of mode 3 after 10 minutes if it has not received any "Enroll" request. It is possible to enter mode 3 as many times as needed. If Controller is programmed with Call Home, a "Network Pulse" is sent to the server 39 at the IP/Hostname every minute. The auto-enrollment process for the auto-enrollment type access controller broadcasts the unit's credentials including model, serial number and MAC address to the server 39.

The installer using the install app scans the QR code that automatically sends via an e-mail the configuration information discussed above to the server 39 including the model, s/n or MAC addresses and pre-loaded credentials of the auto-enrollment type access controller.

Thus, the installer presses and holds 70 the button for 6 seconds, the auto-enrollment process for the auto-enrollment type access controller goes into Mode 1 (Enroll) 72. The gateway 37 receives 74 the broadcast (Enroll), adds 76 the auto-enrollment type access controller's credentials to the "unassigned controller table" and sends enrollment confirmation. Meanwhile, the server 39 receives the e-mail and extracts from the e-mail the configuration information for the particular auto-enrollment type access controller 36a. The particular auto-enrollment type access controller goes 78 into Mode 2 (Acknowledged) at the confirmation receipt.

The server 39 produces a new connection and selects an auto-enrollment type access controller from the "Unassigned controller table" and assigns 84 the controller 36 as a master controller into the new connection. The server sends via the gateway 37 sends 86 a broadcast to the auto-enrollment type access controller 36, and saves 88 the configuration. The auto-enrollment type access controller 36 receives 90 the configuration, reboots 92, and connects 94 back to the gateway 37 so it is now on-line 94. The gateway 37 sends configuration to the auto-enrollment type access controller 96. Only one auto-enrollment type access controller needs to be enrolled as master per U\IP connection.

Figure 6:
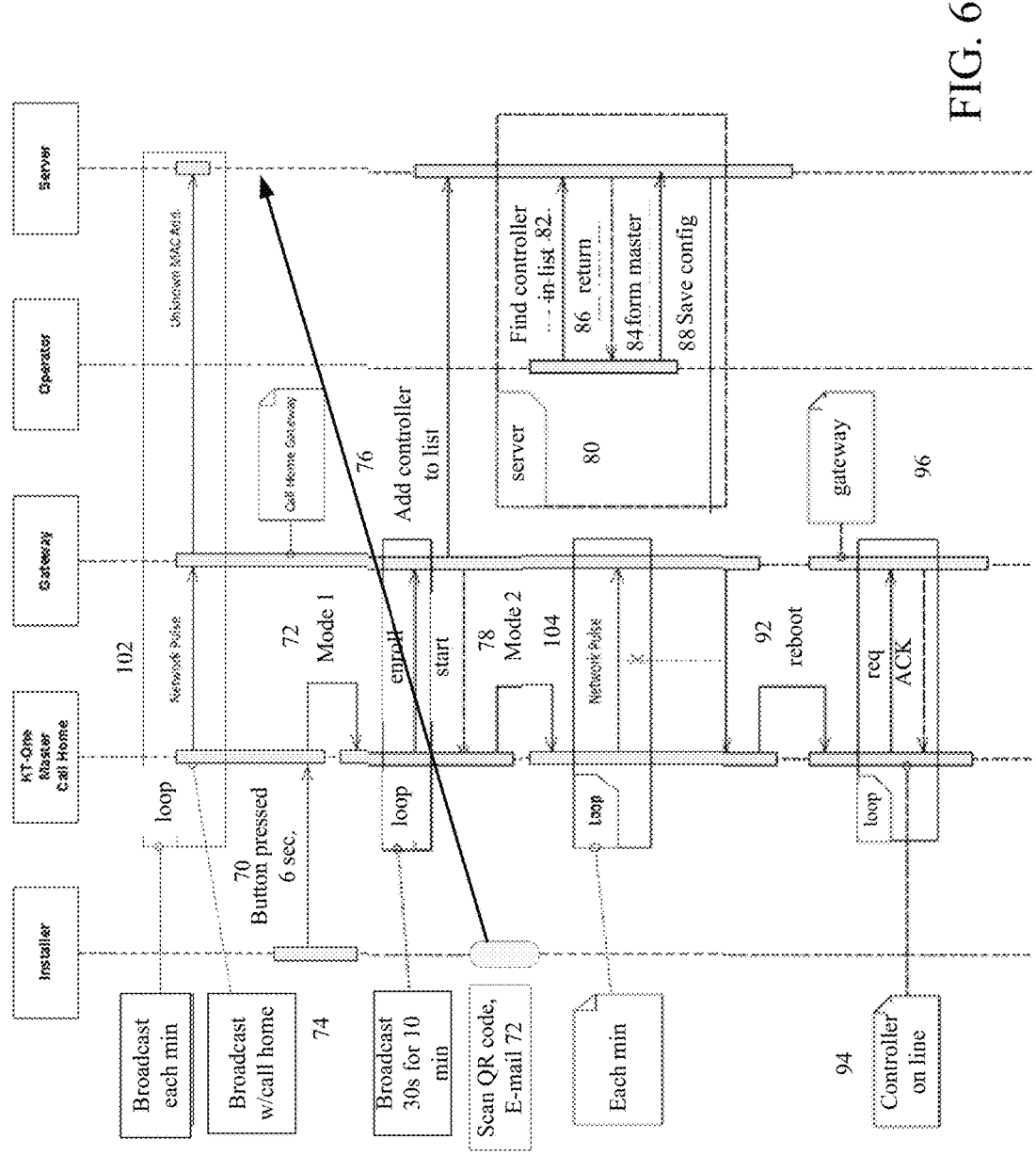

Referring now to FIG. 6, enrollment as a master using call home is similar to that shown in FIG. 5 and these similarities are not repeated here. However, the auto-enrollment type access controller 36 in this process each minute transmits 102 a "network pulse" as discussed above, prior to mode 1 and each minute transmits 104 a "network pulse" after mode 2.

When another auto-enrollment type access controller 36 is already enrolled as master and connected to the gateway 37, other auto-enrollment type access controllers 36 can be configured through the master. These other auto-enrollment type access controller (s) 36 can be enrolled as a slave controller to another master controller by the installer pressing and holding the button 38 on that auto-enrollment type access controller 36 for 6 seconds.

From the installer's point of view the process is the same, as depicted in FIG. 5 and thus is not repeated here. From the server 39 however, because the IP address of the master is being used to transmit the request for the slave, during the enroll mode, an server selects the auto-enrollment type access controller 36 from the "Unassigned controller table" and assigns that selected controller 36 as a slave controller in an existing connection. The gateway 37 sends the slave's auto-enrollment type access controller information to master controller of the connection. The master auto-enrollment type access controller sends broadcast to the slave auto-enrollment type access controller. The slave auto-enrollment type access controller receives the IP configuration, reboots and connects back to the master auto-enrollment type access controller. Both master and slave auto-enrollment type access controller are on same Local Area Network.

When another auto-enrollment type access controller is already enrolled as master and connected to the gateway, other auto-enrollment type access controllers can be configured through the master with entering call home mode, by the installer pressing and holding the button for 6 seconds at which point the other auto-enrollment type access controller(s) are configured through the master. One or many master auto-enrollment type access controller(s) on various IP connections receives the broadcast and forwards slave's credentials to one or many Gateway(s). The gateway(s) adds the slave auto-enrollment type access controller credentials to the "Unassigned controller table" and sends enrollment confirmation to the master auto-enrollment type access controller.

At the confirmation receipt, the master auto-enrollment type access controller sends enrollment confirmation to the slave auto-enrollment type access controller. The slave auto-enrollment type access controller goes into Mode 2 (Acknowledged) at the confirmation receipt. The server 39 selects the auto-enrollment type access controller from the "Unassigned controller table" and assigns it as a slave controller in an existing connection. The master auto-enrollment type access controller sends broadcast to slave auto-enrollment type access controller; the slave auto-enrollment type access controller receives the IP configuration, reboots and connects back to the master auto-enrollment type access controller. Both auto-enrollment type access controller (master and slave) are on same Local Area Network. If multiple master auto-enrollment type access controller receives the broadcast, each will attempt to add the auto-enrollment type access controller to the "Unassigned controller table" and the server 39 will automatically purge duplicate entries.

Figure 7:
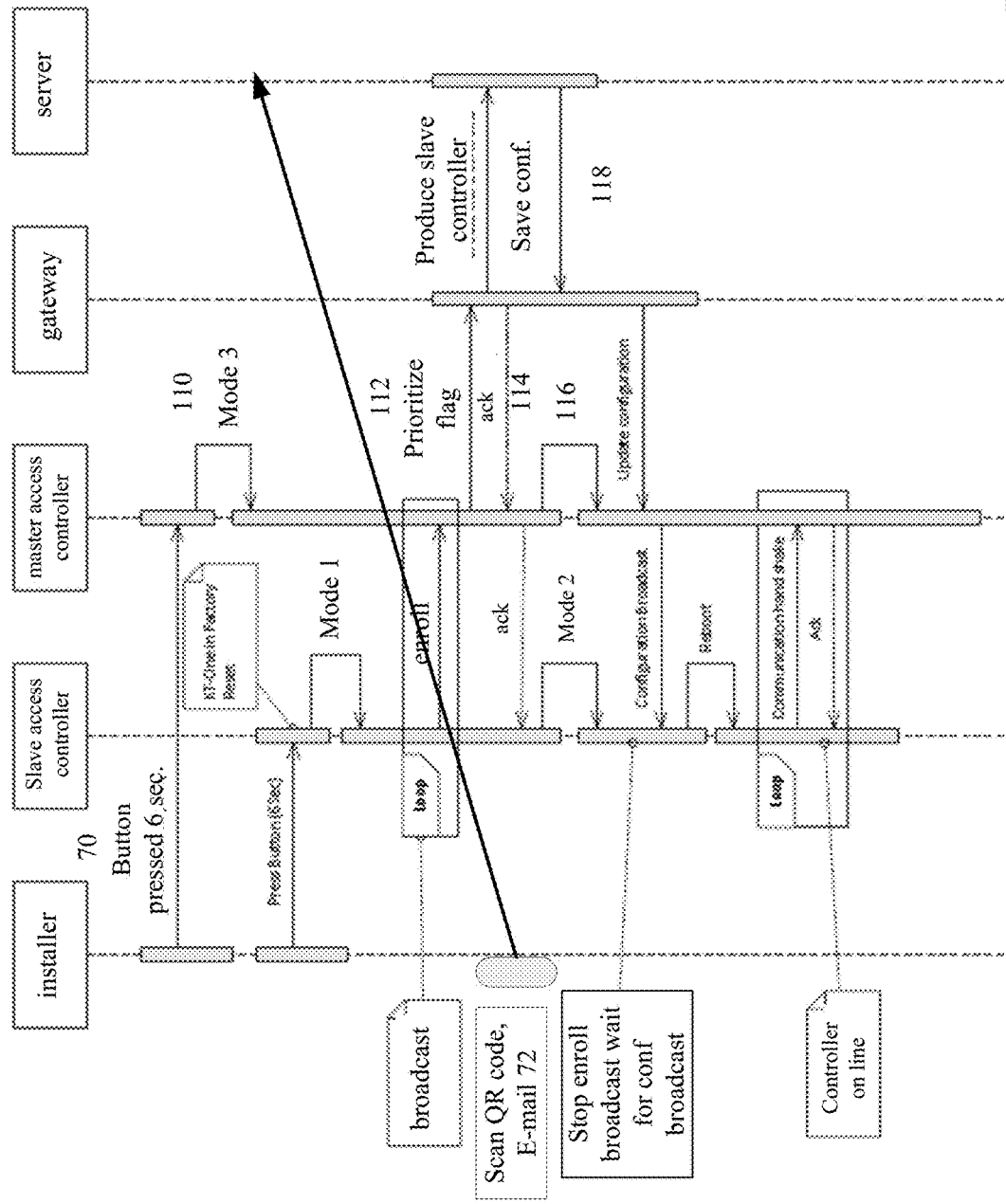

Referring now to FIG. 7, the installer can automatically enroll a slave auto-enrollment type access controller to an existing connection without the need of an operator, to limit the amount of traffic on the network, provided that the server 39 is running and the auto-enrollment type access controller slave in factory default and has not been programmed in the sever. The auto-enrollment type access controller slave is connected to the network with DHCP enabled and the master auto-enrollment type access controller is enrolled and connected to the gateway. Dynamic Host Configuration Protocol (DHCP) is a standardized networking protocol used on Internet Protocol (IP) networks for dynamically distributing network configuration parameters, such as IP addresses for interfaces and services).

The process from the installer point of view is similar to that in FIG. 5, and those similarities are not repeated here. The installer presses and holds the master's button for 6 seconds. The master auto-enrollment type access controller goes 110 into Mode 3 (Prioritize Enroll slave). The Installer presses the button of the slave auto-enrollment type access controller for 6 seconds. The slave auto-enrollment type access controller goes into Mode 1 (Enroll). The master auto-enrollment type access controller receives Broadcast and forwards 112 the slave's credentials to the gateway with 'Prioritize' flag. The Gateway sends 114 acknowledge to master auto-enrollment type access controller. At the Acknowledge receipt, the master auto-enrollment type access controller sends 'go to Acknowledge' to slave auto-enrollment type access controller. The master auto-enrollment type access controller goes out of Mode 3, and the slave auto-enrollment type access controller goes into Mode 2 (Acknowledged) 16 at the Acknowledge receipt. The server 39 verifies that credentials do not exist within the account and if so adds 118 a new controller to the connection. The master auto-enrollment type access controller sends broadcast to slave auto-enrollment type access controller and the slave auto-enrollment type access controller receives the IP configuration, reboots and connects back to the master auto-enrollment type access controller.

Only one master auto-enrollment type access controller can be in Mode 3 at a time. The Enrollment mode is entered when controller is set as master and Online with Gateway. If multiple master auto-enrollment type access controller or Gateways receive the broadcast, each will attempt to add the auto-enrollment type access controller to the "Unassigned controller table". The server 39 will not accept duplicate entries unless one of masters sends a credential that includes the "Prioritize" flag.

Similar as in FIG. 7, when an auto-enrollment type access controller is enrolled as slave in RS-485 using the button without operator, the master auto-enrollment type access controller receives Broadcast and forwards slave's credentials to Gateway with a 'Prioritize' flag. The Gateway sends acknowledge to master auto-enrollment type access controller. At the Acknowledge receipt, the master auto-enrollment type access controller sends 'go to Acknowledge' to slave auto-enrollment type access controller. The master auto-enrollment type access controller goes out of Mode 3, and the slave auto-enrollment type access controller goes into Mode 2 (Acknowledged) at the Acknowledge receipt. The server 39 verifies that credentials does not exist within the account and if so adds a new controller to the connection. The master auto-enrollment type access controller sends a command to the slave auto-enrollment type access controller and the slave auto-enrollment type access controller receives the configuration, The Head Controller, i.e., master/slave configuration approach using IP communication with controllers is suitable for a one-door, dual card reader controller such as the auto-enrollment type access controller. Rather, than define one site for each door the master/slave configuration becomes more efficient. The auto-enrollment type access controller supports POE, thus having to connect 'slaves controllers' to an RS-485 connection makes the auto-enrollment type access controller less attractive and sometimes even restrictive. A solution is to add a new communication 'Path' between the server 39 and the controllers, via this master controller.

A Traditional Communication Architecture had a head controller connect to a server 39 using an IP connection and have other slave controllers connect in a serial fashion to the head controller by a last one of the slave controllers connecting to a preceding slave controller, and so forth until a first one the slave controllers connect to the master. The master controller (Defined @ position 0 in the server 39 site definition) communicates using UDP/IP (user datagram protocol over Internet Protocol) or TCP/IP (transmission control protocol over Internet Protocol) communication, and discovers slave controllers using UDP/IP and transfer data both ways, via a router.

Hybrid connectivity combines both of the above solutions all together at once. Slave controllers defined @ positions 1~31 in the server can be connected either on the RS-485 connector or on the same IP network as the master controller. The server 39 issues a start poll' to the 'Head Controller', and looks into its controller table for defined controllers that could be connected through IP. The 'Head Controller' broadcasts on its local subnet mask using a command 'IP_CMD_KTBROADCAST_USING_SERIAL' command. This command is used in lieu of a command that relies on the presence of MAC addresses in the Head Controller, as the head controller does not possess the MAC addresses of its eventual slave controllers, as the server 39 does. But the head controller does have the slave controller serial numbers that are also unique (at production level) and are used to discover the new devices through broadcast.

The slave controller is not connected directly to the server 39 but to the slave it appears that it is, the slave controller reboots after receiving its configuration from the 'Head Controller' and is instructed to communicate to with the server 39 an address corresponding to the IP address of the 'Head Controller'. The server 39 is also instructed to poll only one controller: itself. Shortly after the 'Head Controller' establishes initial communication with the server 39 all of the 'slave IP controllers' reboot at site initialization and until a factory default is performed on the slave controllers.

For protocols with minimal support where packets that were sent to over an RS-485 connection and were 'wrapped' into an IP command and then unwrapped by the 'Head Controller' and sent to the slave BUS rather than having the 'Head Controller' at position 0 and the slave controllers at other positions and thus requiring all slaves IP controllers to be mapped at position 0, the master controller is permitted to reside at any device position.

Figure 8:
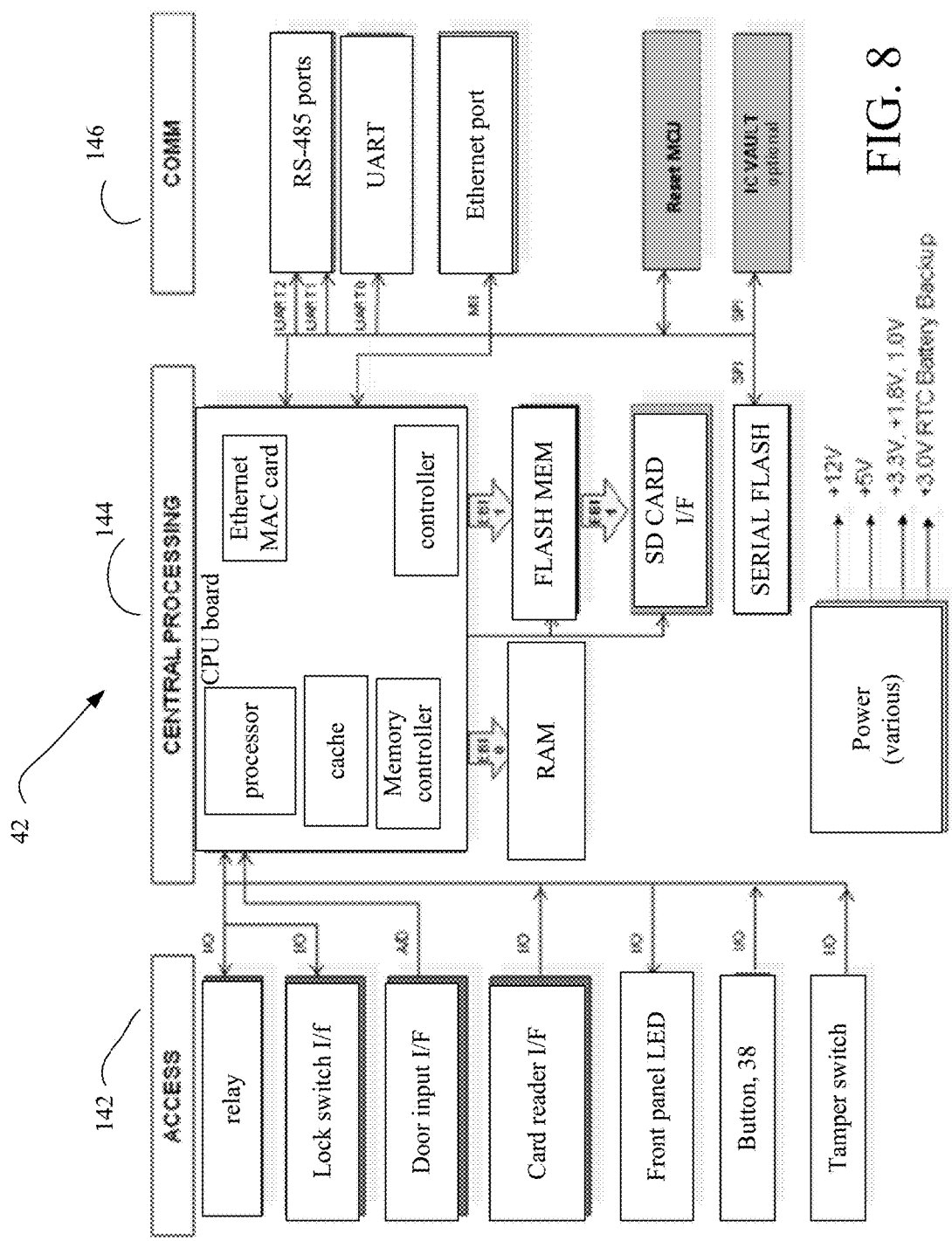
FIG. 8 is a block diagram of details of the auto-enrollment access controller.

Referring now to FIG. 8, an exemplary control board 42 for the auto-enrollment type access controller 36 is shown, including access functional components 142 such as relay control, lock/switch I/F, door input I/F, card reader I/F, front panel LED, the button 38, and a tamper switch. A central processing module 144 including a processor board having a processor, cache memory, memory controller and RAM, flash memory an Ethernet or other network I/F card and flash and SD card and controller. The control board 42 also includes communication side 146 that includes RS-485 ports, a UART (universal asynchronous receiver/transmitter that translates data between parallel and serial forms), Ethernet port, a reset and IC vault (motor locking device). Typically, the memories, e.g., RAM, Flash, etc. stores a computer program product to configure the processor to perform the functions discussed above.

Figure 9:
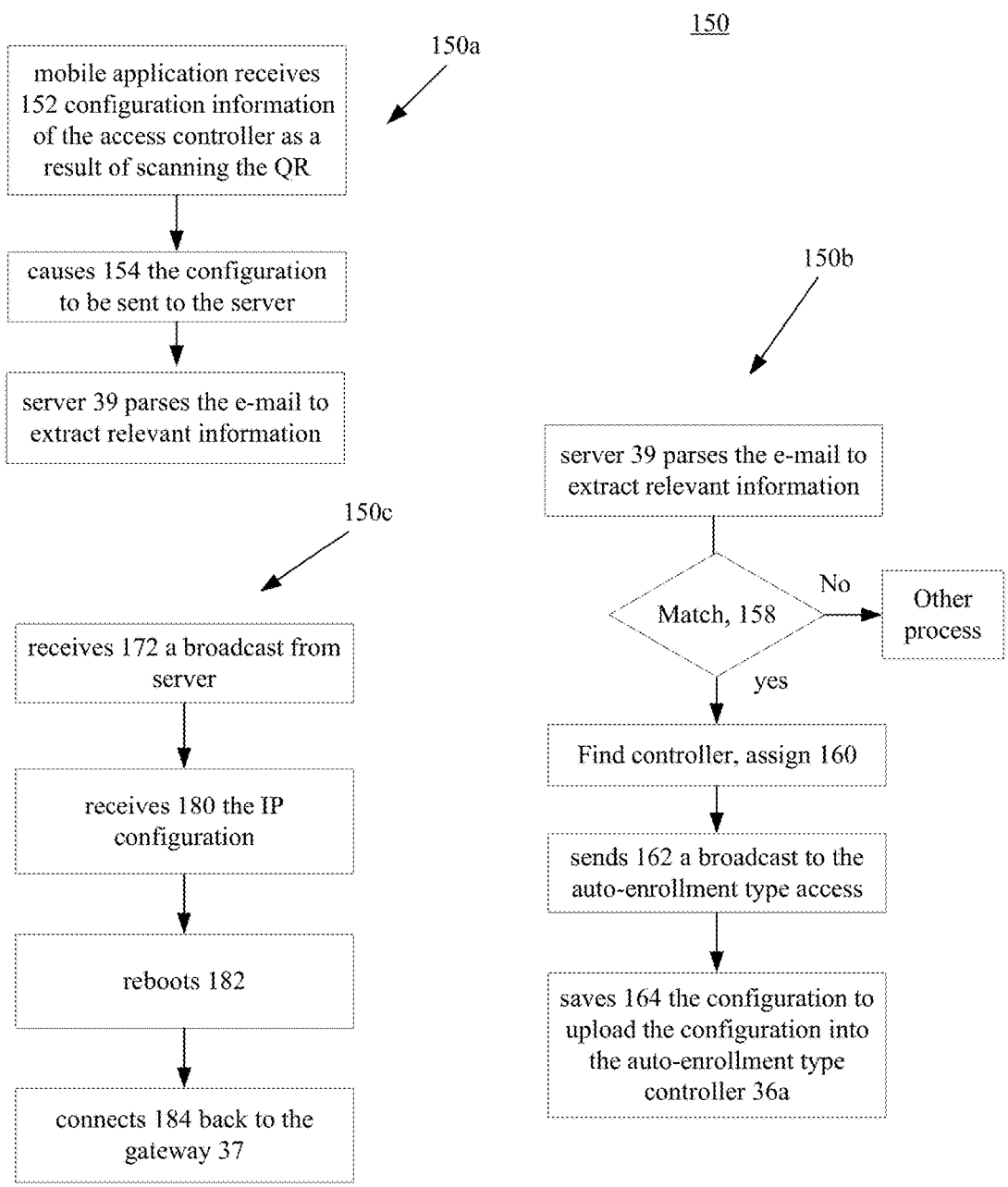
FIG. 9 is a flow chart depicting client, server and access controller functions.

Referring now to FIGS. 9A and 9B, the code enabled auto configuration process 150 is shown as processes 150a, 150b and 150c executing on the client 31, server 39 and auto enrollment access controller 36a. This code enabled auto configuration process 150 does not involve the need for an operator to be present at the server 39.

Process 150a starts, with launching of the install application on the client, which connects (not shown) with the server 39. When the button 38 is used as an enrollment button as discussed in FIG. 5, the enrollment starts with an installer pressing 70 the front button for e. g., six seconds and launching the install app on the mobile device 31. The installer using the mobile device 31 scans a code, e.g., a one dimensional or two dimensional (matrix) bar code, such as a QR® code (Denso Wave Incorporated) on the particular auto-enrollment type controller, e.g., controller 36a, which is received by the mobile device 31. In this configuration process 150, the mobile application receives 152 configuration information of the access controller as a result of scanning the QR code to configure the controller and causes 154 the configuration to be sent to the server.

Process 150b has the server 39 receiving the OR code via the e-mail and parsing 156 the e-mail to extract relevant information obtained from the QR code scan and determining 158 whether there is a match with an unassigned controller. If there is a match, the server 39 executes 160 the process in FIG. 5 (i.e., produces finds 82 an auto-enrollment type access controller from the "Unassigned controller table" and assigns the controller 36 as a master controller into the new connection and saves the configuration) and sends 162 a broadcast to the auto-enrollment type access controller 36, and saves 164 the configuration to upload the configuration into the auto-enrollment type controller 36a. If there is not a match the server 39 can executes processes to, e.g., enroll and configure slave controllers, etc.

The QR code on the auto-enrollment access controller has information that unique to that specific access controller. Once the code is read by the mobile device, the mobile device saves the file, and sends the file with that unique information to the server to start the configuration process. From scanning the QR code the installer gets the MAC Address, Serial number and Batch number of the controller. The installer can scan plural ones of the QR codes for plural devices, each producing a file that is saved on the mobile device and can produce a list of all such files saved on the mobile device. The gateway 37 sends configuration to the auto-enrollment type access controller.

Process 150c has the auto-enrollment type access controller 36 receiving 180 the IP configuration, rebooting 182, and connecting 184 back to the gateway 37 so it is now on-line. Only one auto-enrollment type access controller needs to be enrolled as master per IP connection.

Memory stores program instructions and data use by the processor of the access controller, and/or server, smart phone, tablet and other computer systems. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and for some of the systems a keypad/keyboard. Other software components suitable for establishing a connection and communicating across network will be apparent to those of ordinary skill.

Program instructions stored in the memory, along with configuration data may control overall operation of the panel.

The server includes one or more processing devices (e.g., microprocessors), a network interface and a memory (all not illustrated). The server may physically take the form of a rack mounted card and may be in communication with one or more operator terminals (not shown). Each server address may be static, and thus always identify a particular server. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like and have access to a subscriber database that includes a database under control of a database engine. The database may contain entries corresponding to the various subscriber devices/processes.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

What is claimed is:

1. A method of configuring an auto-enrollment type controller, the method comprising:
    asserting a command to the auto-enrollment type controller, with the assertion of the command being for a minimum specified duration that causes the auto-enrollment type controller to enter an auto-enrollment process;
    broadcasting by the auto-enrollment type controller to an enrollment server, an enrollment request message with the broadcast being in response to the auto-enrollment type controller entering the auto-enrollment process;
    adding by the enrollment server credential data associated with the auto-enrollment type controller to a list based on the broadcasting, wherein the list comprises credential data for each of a plurality of other auto-enrollment type controllers, wherein each the plurality of other auto-enrollment type controllers are waiting to be enrolled;
    capturing by a user device a code associated with the auto-enrollment type controller, with the captured code including auto-enrollment type controller configuration information;
    causing by the user device the credential data and the auto-enrollment type controller configuration information from the captured code to be sent to a server;
    identifying by the enrollment server the auto-enrollment type controller in the list by searching the list with the credential data; and
    programming by the enrollment server the auto-enrollment type controller with the auto-enrollment type controller configuration information in response to identifying the auto-enrollment type controller in the list.

2. The method of claim 1, wherein the method further comprises:
    rebooting by the auto-enrollment type controller in response to programming the auto-enrollment type controller; and
    connecting by the auto-enrollment type controller to a gateway to place the auto-enrollment type controller on-line in response to programming the auto-enrollment type controller.

3. The method of claim 1, wherein the code is a two dimensional bar code.

4. The method of claim 1, further comprising:
    enrolling the auto-enrollment type controller as a master controller by transmitting periodically by the auto-enrollment type controller a network message to enroll the auto-enrollment type controller, subsequent to assertion of the command.

5. The method of claim 1, wherein the auto-enrollment type controller enrolls another controller as a slave controller when a master controller is enrolled and connected to a gateway, by enrolling the another auto-enrollment type controller through the master controller; and the another auto-enrollment type controller is configured by:
    capturing a second code associated with the another auto-enrollment type controller;
    causing the captured second code to be sent to the enrollment server;
    receiving by the auto-enrollment type controller from the enrollment server, second configuration information; and
    configuring the another auto-enrollment type controller using the received second configuration information.

6. A server system, comprising:
    a processor;
    memory; and
    a computer program product to configure the processor to:
        receive an enrollment request broadcasted from an auto-enrollment type controller;
        add credential data associated with the auto-enrollment type controller to a list, wherein the list comprises credential data for each of a plurality of other auto-enrollment type controllers, wherein each the plurality of other auto-enrollment type controllers are waiting to be enrolled;
        receive a code associated with enrollment of the auto-enrollment type controller, with the code including auto-enrollment type controller credential data and configuration information;
        extract the configuration information from the code;
        identify the auto-enrollment type controller in the list by searching the list with the auto-enrollment type controller credential data, and upon identifying the auto-enrollment type controller:
            assigning the auto-enrollment type controller as a master controller into a new connection;
            programing the auto-enrollment type controller configuration information, as contained in the code associated with the auto-enrollment type controller.

7. The system of claim 6, wherein the code is a two dimensional bar code that is unique to the auto-enrollment type controller.

8. The system of claim 6, wherein the code is a two dimensional bar code that is unique to the auto-enrollment type controller and that encodes at least one of a MAC address, serial number or batch number of the auto-enrollment type controller.

9. A method of configuring an auto-enrollment type access controller, the method comprising:
broadcasting by the auto-enrollment type access controller to an enrollment server, an enrollment request message with the broadcast being in response to the auto-enrollment type access controller entering an auto-enrollment process;
adding by the enrollment server credential data associated with the auto-enrollment type access controller to a list based on the broadcasting, wherein the list comprises credential data for each of a plurality of other auto-enrollment type access controllers, wherein each the plurality of other auto-enrollment type access controllers are waiting to be enrolled;
capturing by a user device a code associated with the auto-enrollment type access controller, with the captured code including auto-enrollment type access controller configuration information;
causing by the user device credential data and the auto-enrollment type access controller configuration information associated with the captured code to be sent to the enrollment server;
identifying by the enrollment server the auto-enrollment type access controller in the list by searching the list with the credential data; and
programming by the enrollment server the auto-enrollment type access controller with the auto-enrollment type access controller configuration information in response to identifying the auto-enrollment type access controller in the list.

10. The method of claim 9, programming further comprising:
rebooting by the auto-enrollment type access controller; and
connecting by the auto-enrollment type access controller to a gateway to place the auto-enrollment type access controller on-line.

11. The method of claim 9, wherein the code is a two dimensional bar code.

12. The method of claim 9, further comprising:
enrolling the auto-enrollment type access controller as a master by transmitting periodically, by the auto-enrollment type access controller a network message to enroll the auto-enrollment type access controller, subsequent to assertion of the broadcasting.

13. The method of claim 9, wherein the auto-enrollment type access controller enrolls another auto-enrollment type access controller as a slave controller when a master controller is enrolled and connected to a gateway, by enrolling the another auto-enrollment type access controller through the master controller, and the another auto-enrollment type access controller is configured by:
capturing a second code associated with the another auto-enrollment type access controller;
causing the captured second code to be sent to the enrollment server;
receiving by the auto-enrollment type access controller from the enrollment server, second enrollment information; and
configuring the another auto-enrollment type access controller upon receiving the second enrollment information.

14. The system of claim 6, wherein the configuration information is for an auto-enrollment type controller.

15. The system of claim 6, wherein the computer product program configures the processor to receive the code via an e-mail message.

16. An auto-enrollment type access controller, comprising:
access control functional components;
a switch device affixed to the auto-enrollment type access controller, the switch device upon assertion for a minimum specified duration causing the auto-enrollment type access controller to enter an auto-enrollment process;
a device having a code that encodes configuration information for the auto-enrollment type access controller;
a central processing module including a processor board having a processor, memory, communication interface and network interface circuity and storage that stores a computer program product to configure the processor to auto-enroll the auto-enrollment type access controller, with the computer program product comprising instructions to:
receive an assertion of a command upon actuation of the switch to initiate the auto-enrollment process;
cause a server to add credential information associated with the auto-enrollment type access controller to a list by broadcasting an enrollment request message in response to a reception of the assertion of the command, the list comprising credential data for each of a plurality of other auto-enrollment type access controllers, wherein each of the plurality of other auto-enrollment type access controllers are waiting to be enrolled;
identifying by the server the auto-enrollment type access controller in the list by searching the list with the credential data;
receive by the auto-enrollment type access controller from the server an enrollment confirmation;
program the auto-enrollment type access controller with the configuration information in response to a reception of the configuration information from the server.

17. The auto-enrollment type access controller of claim 16, wherein the access functional components comprise at least one of a relay control, a lock/switch interface, door input interface, or a card reader interface;
wherein the computer program product further comprises instructions to:
upon receiving the configuration information from the server, reboot the auto-enrollment type access controller; and
connect to a gateway to place the auto-enrollment type access controller on-line.

18. The auto-enrollment type access controller of claim 16, wherein the code is a two dimensional bar code.

19. The auto-enrollment type access controller of claim 16, further comprising instructions to:
enroll the auto-enrollment type access controller as a master controller by transmitting periodically by the auto-enrollment type access controller a network message to enroll the auto-enrollment type access controller, subsequent to assertion of the switch.

20. The auto-enrollment type access controller of claim 16, wherein the auto-enrollment type access controller enrolls another auto-enrollment type access controller as a slave controller when a master controller is enrolled and connected to a gateway, by enrolling the another auto-enrollment type access controller through the master controller.

* * * * *